Jan. 1, 1957   P. L. BAKER   2,775,841
FISHING LURE
Filed June 17, 1955

Paul L. Baker
INVENTOR.

BY *Clarence A. O'Brien*
*and Harvey B. Jacobson*
Attorneys

United States Patent Office 2,775,841
Patented Jan. 1, 1957

2,775,841

FISHING LURE

Paul L. Baker, Marceline, Mo.

Application June 17, 1955, Serial No. 516,201

2 Claims. (Cl. 43—42.48)

The present invention relates to an improved artificial fish lure which is characterized by a buoyant plug designed to represent a live minnow of one kind or another and is otherwise constructed to imitate the natural swimming and other attending actions and characteristics of the minnow which it represents.

Another object of the invention is to provide a fish lure which embodies, among other complements, a small but elongate buoyant plug having body and tail portions in general longitudinal alignment, said portions being essentially circular in cross-section in a length wise direction and gradually decreased in cross-section from the leading end of the body toward the trailing end of the tail portion to thus provide a suitably tapering lure, the terminal end of the tail portion being convex and blunt, said body portion having vertical sides, a longitudinally bowed and convex dorsal surface, and a longitudinally concave ventral surface, the leading or forward end of said body being fashioned into a distinctive head or bill portion which promotes the desired life-like activity of the lure and makes it possible for the angler to skillfuly manipulate the lure to effectively attract and catch trout, bass, crappie and the like.

A further object of the invention is to provide a plug body, the forward end of which is structurally and characteristicly distinct and distinguishable from other and seemingly analogous lures in that it is equipped with a concave leading end situated rearwardly of a forwardly extending specially disigned bill portion and a gradually sloping lip overhanging the upper portion of said concave leading end.

Other objects, features and advantages will become more readily apparent from the following description and the accompanying drawings.

In the drawings, wherein like numerals are employed to designate like parts throughout the views.

Figure 1:
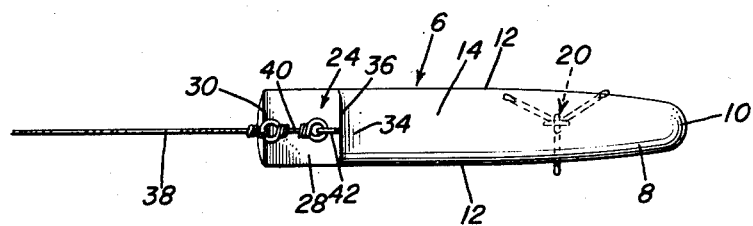
Figure 1 is a plan view of the improved fish lure.
Figure 2:
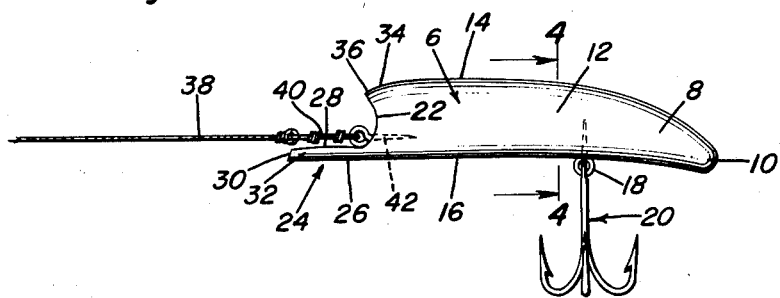
Figure 2 is a side elevation of the same.
Figure 3:
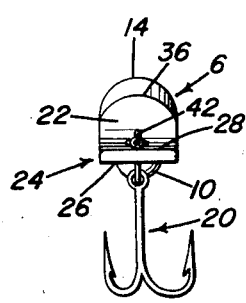
Figure 3 is a front end elevation.
Figure 4:
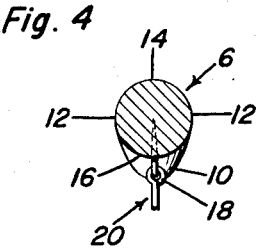
Figure 4 is a cross-section on the line 4—4 of Figure 2.

Referring now to the drawings, the buoyant plug is preferably of wood or commercial plastics. The chief part here called the body is denoted by the numeral 6, and at the rear thereof is the tail portion 8. It will be noted that the terminal of the tail portion is rounded or convex and the shape is such that it is blunt, as at 10. The body gradually decreases in cross-section and may be said to taper rearwardly where it merges into the tail portion. The cross-section is essentially circular, as brought out in Figure 4. The lengthwise sides are here treated as vertical sides 12. The top or dorsal surface 14 is bowed longitudinally and is defined as convex. The ventral side 16 is concave in a lengthwise direction. Intermediate its ends, the body is provided, on the ventral side 16, with an eye screw 18 equipped with a suitable fishhook 20.

The specially designed forward or head end of the body is of chiefest importance. It will be noticed that the leading end is recessed at 22, said recess being concave. The portion below the longitudinal center line of the primary axis of the body is formed with an integral extension herein described as a bill portion 24. It will be noticed that this bill portion has a substantially flat bottom 26 which is a smooth continuation of the adjacent portion of the ventral side and may be said to be either coplanar or flush therewith. The bill portion is rectangular in cross-section and provides a flat top 28, and this is on a plane below the center of the concave or recess 22. The forward end of the bill portion is tapered forwardly and downwardly, as at 30. Inasmuch as the bill portion is thus attenuated by this rectangular cross-sectional shape, it may be treated as linearly straight and relatively thin. It is in width approximately the same as the principal diameter of the body, and the straight longitudinal edges 32 are substantially flush with the adjacent portions of the vertical sides 12. The forward or leading end of the ventral side 14 slopes gradually down at 34 and defines an overhanging lip 36. This is above the median portion of the recess 22 and thus overhangs the recess. It defines a sort of a cove between the lip and the flat top 28 of the bill portion. It is in this cove that the fishing line 38 is anchored. The line is joined with a suitable connector 40, and the latter is in turn joined with the eye of an eye screw, the shank of which is denoted at 42. This screws lengthwise into the recessed leading end just above the flat top 28. This places the point of anchorage of the line at the junctional portions of the top 28 and lower portion of the cavity or cove. This point of line attachment is important because it permits the lure to be controlled easily and naturally by the fisherman. When properly handled the lure remains at a constant depth, or at such depth as the fisherman determines. It clears the water for recasting without suction or pull, thereby preventing possible damage to the rod tips or breaking lines or the lightest of leaders. It is such in construction that it will appeal to both manufacturers and users. It may be enameled or otherwise coated or painted with varying effective colors. This lure can be made in all sizes for fly rod or casting rod use, and, of course, hooks can be used of single or treble design and size. The connection between the eye screw and line may be, if desired, a link or swivel. The hook is preferably attached approximately one-half inch or so from the blunt end of the tail portion.

Since numerous modifications and changes will readily occur to those skilled in the art, it is not desired to limit the invention to the exact construction and operation shown and described, and accordingly, all suitable modifications and equivalents may be resorted, to, falling within the scope of the invention as claimed.

What is claimed is as follows:

1. An artificial fish lure designed to represent a given live minnow comprising an elongate buoyant body having central and tail portions in general longitudinal alignment, essentially circular in cross-section lengthwise and gradually decreased in cross-section from the leading toward the trailing end, the terminal of said tail portion being convex and blunt, said central and tail portions having a dorsal surface longitudinally convex and a ventral surface longitudinally concave, the leading end of said body having a forwardly projecting extension defining a linearly straight bill portion, said bill portion being rectangular in cross-section and having a substantially flat bottom which is an extension of and is substantially coplanar with the adjacent portion of said ventral surface, said bill portion being of uniform cross-sectional thickness from end to end and the thickness thereof being appreciably less than the cross-section of the leading end of said central portion, said bill portion having a substantially flat top side disposed in a plane below the principal longitudinal axis of said body, the transverse forward end of said bill portion being beveled downwardly, said bill portion being of the same width from end to end and the longitudinal edges thereof being smooth and in approximate alignment with the vertical sides of the leading end of said central portion, the leading end of said central portion being recessed and providing a concavity the ends of which open through the vertical sides of the central portion, said recess also defining and providing a lip and said lip overhanging the upper portion of said concavity.

2. The structure defined in claim 1 and a line attaching screw eye anchored in the lower portion of said concavity end at the junctional portion of said leading end and flat top of said bill portion.

References Cited in the file of this patent

UNITED STATES PATENTS

| | | |
|---|---|---|
| 1,745,006 | Chapleau | Jan. 28, 1930 |
| 2,036,946 | Malecek | Apr. 7, 1936 |
| 2,588,913 | Dewey | Mar. 11, 1952 |